Aug. 29, 1933.    H. P. BROWN    1,924,705
DRAFT SHIELD
Filed Sept. 21, 1931
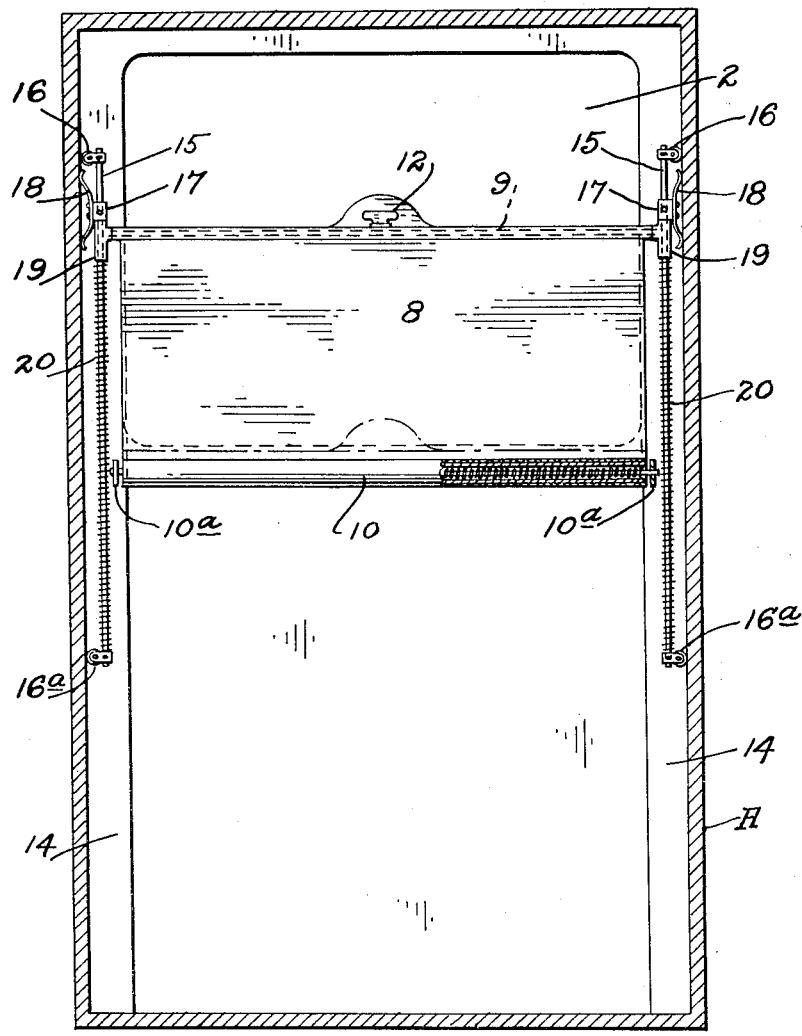
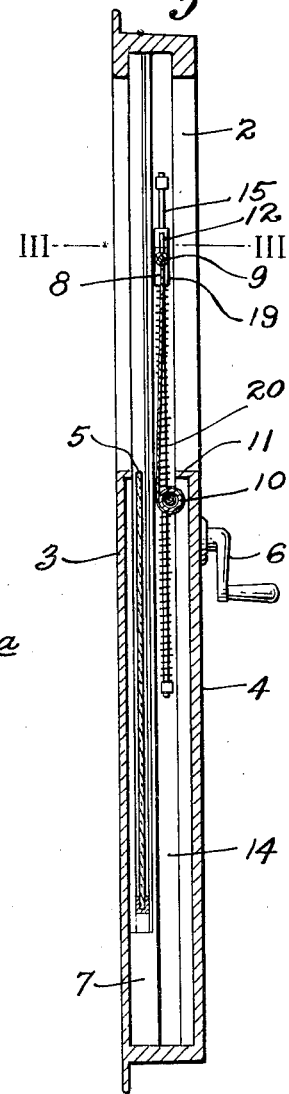
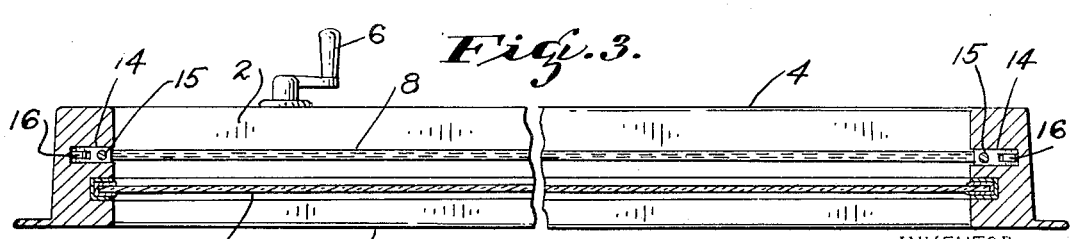
INVENTOR.
Horace P. Brown.
BY Townsend & Loftus
ATTORNEYS.

Patented Aug. 29, 1933

1,924,705

UNITED STATES PATENT OFFICE 1,924,705

DRAFT SHIELD

Horace P. Brown, Oakland, Calif.; Clara B. Brown executrix of said Horace P. Brown, deceased Application September 21, 1931
Serial No. 564,029

15 Claims. (Cl. 296—44)

This invention relates to a draft or windshield for automobiles and like vehicles and particularly to a shield which is operable in the window opening adjacent the driver's seat.

In the operation or driving of automobiles it is essential and, in fact, required by law that a signal be given when turning right or left and also when slowing down or when coming to a stop. The most common method of signaling is arm signaling. This necessitates extension of the driver's arm through the window, but before the arm can be extended, the window must be lowered. Practically all windows are raised or lowered by hand crank and connected mechanism and this takes time and, if a person is driving in congested traffic where it is necessary to give frequent signals, it is almost necessary to leave the window fully open thereby subjecting the driver and other occupants of the car to excess draft, entrance of rain, etc., during inclement weather.

The object of the present invention is to overcome the objections above referred to by providing a draft or windshield insertable in the window opening which may be lowered by slight downward pressure of the driver's arm thus permitting the window proper or in other words the crank operated window to remain fully open, if desired, without exposing the occupants of the car to excess draft, rain, etc.; to provide a draft or windshield which may be readily applied in the window opening of an automobile without interfering with the window proper or its operating mechanism; to provide a draft or windshield which may be adjusted to any height desired; and further, to provide a shield of the character described which is automatically returned to raised position when the driver's arm is withdrawn.

The invention is shown by way of illustration in the accompanying drawing, in which—

Fig. 1 is a side elevation of an automobile door, showing the window opening formed therein and the draft shield with connected mechanism, said side elevation being in section and being taken on line I—I of Fig. 2.

Fig. 2 is a vertical central cross section of an automobile door showing the application of the invention.

Fig. 3 is a horizontal cross section taken on line III—III of Fig. 2.

Fig. 4 is an enlarged longitudinal section of one end of the cross rod or tube 9.

Referring to the drawing in detail and particularly Figs. 1 and 2, A indicates the frame of an automobile door and 2 the window opening formed therein. The exterior surface of the door is, in this instance, shown at 3 and the inner surface at 4. The window opening 2 is adapted to be closed by the usual window 5 which is raised and lowered by means of a hand crank or the like such as indicated at 6. During rotation of the crank, the window is caused to travel upwardly or downwardly, as the case may be, through a suitable mechanism interconnecting the crank and the window such as chains or gearing of a well known character and for this reason not illustrated. The window 5 when lowered extends into the usual pocket indicated at 7 and when raised closes the window opening 2.

It has previously been stated that if the driver is encountering heavy traffic and signals are frequently given, it is almost necessary to leave the window in a fully opened position as the time required in operating the crank 6 to open or close the window is such as to seriously interfere with the giving of signals and sometimes positively prevents the giving of a signal before it is too late. Hence, the main window is usually left open under such conditions and the driver is unnecessarily exposed to draft, rain, and so on.

This objection has been overcome in the present instance by providing a curtain generally indicated at 8. It may be made of a transparent material, or any other suitable material. One end of the curtain is attached to a cross rod or tube 9 while the other end is fastened to a shade roller such as indicated at 10. This roller is disposed in the pocket 7 of the door at a point below the sill 11 and when the cross rod 9 is pulled upwardly by means of the tab indicated at 12, the curtain unrolls from the roller 11 and thereby partially closes the window opening in such a manner as to exclude the weather.

The shade roller shown in the present instance is of standard construction. It is journaled in brackets 10a at opposite ends and is provided with an interior spring which exterts a constant tension to re-roll the curtain, hence means must be provided for securing the cross rod 9 and curtain 8 when pulled to a raised position.

The means employed are a pair of trackways formed one in each side of the window frame. These trackways are indicated at 14 and they function as tracks and guides for a pair of carriages such as shown in Fig. 1. Each carriage is identical in construction and consists of rods 15 on opposite ends of which are mounted rollers 16. A collar 17 is secured adjacent the upper end of each rod and each collar carries a spring friction shoe 18, the function of which will hereinafter be described. Each rod also carries a sleeve 19 which is vertically slidable on its respective rod and the sleeves 19 in turn carry the cross rod 9 and the curtain 8 attached thereto. A spring 20 engages each sleeve 19, the springs 20 being interposed between said sleeves and the lower rollers 16a. The springs are comparatively long and as such function as resilient supports for the cross rod and the curtain, the tension being just sufficient to maintain the curtain in raised position and at the same time exerting more tension than the shade roller spring so as to counteract the re-rolling tendency of the same.

The operation of the device will be as follows: If the curtain is raised to the position shown in Fig. 1 and the driver desires to signal, he merely extends his arm through the opening formed above the curtain and then exerts a slight downward pressure on the rod 9. Such downward pressure will cause the sleeves 19 to slide downwardly on the rods 15 against the tension of the springs 20, hence giving the driver complete freedom to give the proper signal. The moment the signal is given, his arm is withdrawn and as the springs 20 have been placed under a slight tension the cross rod and curtain will be raised to the position formerly assumed. The curtain will not bulge during this operation as the downward movement of the rod releases the tension on the curtain, hence permitting the spring within the shade roller to re-roll it as the curtain moves downwardly, but the moment the curtain is released by withdrawing of the arm the tension of the springs 20 overcomes the tension of the spring roller and the curtain is thus raised and it is maintained in a taut condition.

The curtain may be raised to any height desired as an upward pull on the tab 12 causes the cross rod and the sleeves 19 to engage the collars 17, thus raising the carriages to any height desired, and the carriages will remain in the position to which they have been raised due to the friction of the spring shoes 18; the friction of these shoes being more than sufficient to overcome the tension or pull of the spring within the shade roller and being also sufficient to overcome the tension of the springs 20 when these are compressed due to the momentary lowering of the curtain.

If the weather is warm and complete ventilation of the car is desired, the carriages, together with the curtain, may be completely lowered into the pocket 7. This is accomplished as follows: By referring to Fig. 4, it will be noted that what has heretofore been termed the rod 9 is in reality a tube and that a pair of locking rods 24 are disposed interior of the same. The inner ends of the rod are pivotally attached to crank pins 25 formed on the crank disc 26. This, in turn, is secured on a vertically disposed rod or pin 27 and a turn-knob 28 is secured on the upper end thereof. The outer ends of the locking rods 24 extend through the bearing sleeves 19 and are adapted to engage notches 15a formed in the carriage rods 15. Hence, if it is desired to completely lower the carriages and the curtain into the pocket, the turning knob 28 is turned from a position at right angles to the rod or tube 9 to a position parallel thereto as shown in Figs. 1 and 4. In so doing, motion is transmitted through the crank pins 25 to force the locking rods 24 outwardly. They thus engage in the notches 15a formed in the carriage rods, hence it is only necessary when the turning knob 28 has been rotated to push downwardly on the tube 9. When so doing, the carriages, together with the curtain, will be forced downwardly into the pocket and will there remain until again required.

To raise the curtain out of the pocket to any height desired, it is only necessary to grasp the tab 12 on the upper end of the curtain and to pull the curtain and the carriages to any height desired. By then turning the knob 28 to a position at right angles to the rod or tube 9 the locking latches are then withdrawn from the notches and the curtain is thus free to be depressed by the arm of the driver when a signal is given.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. In a device of the character described, a frame having a window opening formed therein and a pocket below the window opening, a pair of trackways one in each side of the window opening, a carriage vertically movable in each trackway, a cross rod connecting the carriages whereby they are raised or lowered in the trackways in unison, an extensible curtain in the pocket, a connection between one end of the curtain and the cross rod whereby the curtain is raised or lowered in unison with the carriages, and means whereby vertical movement is imparted to the cross rod and curtain independently of the carriages.

2. In a device of the character described, a frame having a window opening formed therein and a pocket below the window opening, a pair of trackways one in each side of the window opening, a carriage vertically movable in each trackway, a cross rod connecting the carriages whereby they are raised or lowered in the trackways in unison, an extensible curtain in the pocket, a connection between one end of the curtain and the cross rod whereby the curtain is raised or lowered in unison with the carriages, means whereby vertical movement is imparted to the cross rod and curtain independently of the carriages, and means securing the carriages against movement in the trackways during independent movement of the cross rod and curtain.

3. In a device of the character described, a frame having a window opening formed therein and a pocket below the window opening, a pair of trackways one in each side of the window opening, a carriage vertically movable in each trackway, a cross rod connecting the carriages whereby they are raised or lowered in the trackways in unison, an extensible curtain in the pocket, a connection between one end of the curtain and the cross rod whereby the curtain is raised or lowered in unison with the carriages, means whereby vertical movement is imparted to the cross rod and curtain independently of the carriages, and means frictionally securing the carriages against movement in the trackways during independent movement of the cross rod and curtain.

4. In a device of the character described, a frame having a window opening formed therein and a pocket below the window opening, a pair of trackways one in each side of the window opening, a carriage vertically movable in each trackway, a cross rod connecting the carriages whereby they are raised or lowered in the trackways in unison, a roller in the pocket, a curtain attached at one end to said roller and at the opposite end to the cross rod whereby the curtain is raised in unison with the carriages, a spring in the roller tending to re-roll the curtain, means whereby the cross rod and attached curtain is lowered independently of the carriages, and means for automatically returning the cross rod and curtain to raised position.

5. In a device of the character described, a frame having a window opening formed therein and a pocket below the window opening, a pair of trackways one in each side of the window opening, a carriage vertically movable in each trackway, a cross rod connecting the carriages whereby they are raised or lowered in the trackways in unison, a roller in the pocket, a curtain attached at one end to said roller and at the opposite end to the cross rod whereby the curtain is raised in unison with the carriages, a spring in the roller tending to re-roll the curtain, means whereby the cross rod and attached curtain is lowered independently of the carriages, means for automatically returning the cross rod and curtain to raised position, and means securing the carriages against movement in the trackways during independent movement of the cross rod and curtain.

6. In a device of the character described, a frame having a window opening formed therein and a pocket below the window opening, a pair of trackways one in each side of the window opening, a carriage vertically movable in each trackway, a cross rod connecting the carriages whereby they are raised or lowered in the trackways in unison, a roller in the pocket, a curtain attached at one end to said roller and at the opposite end to the cross rod whereby the curtain is raised in unison with the carriages, a spring in the roller tending to re-roll the curtain, means whereby the cross rod and attached curtain is lowered independently of the carriages, means for automatically returning the cross rod and curtain to raised position, and a friction shoe on each carriage securing the carriages against movement in the trackways during independent movement of the cross rod and curtain.

7. In a device of the character described, a frame having a window opening formed therein and a pocket below the window, a trackway on each side of the window opening, a carriage vertically movable in each trackway, a cross rod connecting the carriages, resilient means on each carriage supporting the opposite ends of the cross rod and permitting vertical movement of the cross rod with relation to the carriages and the window opening while the carriages remain stationary, and an extensible curtain connected with the cross rod and movable in unison with the same.

8. In a device of the character described, a frame having a window opening formed therein and a pocket below the window opening, a pair of trackways one in each side of the window opening, a carriage vertically movable in each trackway, a cross rod connecting the carriages whereby they are raised in the trackways in unison, an extensible curtain in the pocket, a connection between the curtain and the cross rod whereby the curtain is raised in unison with the carriages and the cross rod, means whereby the cross rod and curtain may be lowered independently of the carriages and automatically returned to raised position, and other means for lowering the carriages, the cross rod and the curtain in unison.

9. In a device of the character described, a frame having a window opening formed therein and a pocket below the window opening, a pair of trackways one in each side of the window opening, a carriage vertically movable in each trackway, a cross rod connecting the carriages whereby they are raised in the trackways in unison, an extensible curtain in the pocket, a connection between the curtain and the cross rod whereby the curtain is raised in unison with the carriages and the cross rod, means whereby the cross rod and curtain may be lowered independently of the carriages and automatically returned to raised position, and means for forming an interlock between the cross rod and the carriages to lower the cross rod, the carriages and the curtain in unison.

10. In a device of the character described, a frame having a window opening formed therein and a pocket below the window opening, a pair of trackways one in each side of the window opening, a carriage vertically movable in each trackway, a cross rod connecting the carriages whereby they are raised in the trackways in unison, an extensible curtain in the pocket, a connection between the curtain and the cross rod whereby the curtain is raised in unison with the carriages and the cross rod, means whereby the cross rod and curtain may be lowered independently of the carriages and automatically returned to raised position, and an interlocking mechanism carried by the cross rod whereby an interlock may be formed between the cross rod and the carriages to move the same in unison.

11. In a device of the character described a frame having a window opening formed therein with a trackway on each side thereof and a pocket below the window opening, a spring retractible curtain in the pocket, a cross rod with a shoe at each end secured to the free end of the curtain, a carriage vertically movable in the trackway and on which the shoes are slidably mounted, stop members on the carriage engaging the upper ends of the shoes, and springs on the carriage engaging the lower ends of the shoes and maintaining the upper ends of the shoes in engagement with the stop members.

12. In a device of the character described a frame having a window opening formed therein, a closure member vertically movable in the opening, means for moving the closure member to any predetermined position within the window opening, means for retaining the closure member against upwardly closing movement when moved to a predetermined position, said closure member being free to move downwardly when manually depressed, and means for automatically returning the closure member to the predetermined position when relieved of manual downward pressure.

13. In a device of the character described a frame having a window opening formed therein, a closure member vertically movable in the opening, means for moving the closure member to any predetermined position within the window opening, means for retaining the closure member against upward closing movement when moved to a predetermined position, said closure member being free to move downwardly when manually depressed, and spring actuated means for raising the closure to the predetermined position when relieved of manual downward pressure.

14. In a window closure operating mechanism, a frame having a window opening formed therein, a closure vertically movable in said opening, an adjustable stop to maintain the closure in a partially raised position, and means supporting the closure in its raised position, said means permitting lowering of the closure by exerting a downward pressure thereon and said means also returning the closure to its partially raised position when relieved of downward pressure.

15. A window closure mounted for vertical movement, means for retaining the closure in various adjusted positions intermediate the open and closed positions, said means permitting the closure to be moved downwardly by manual pressure thereon, and means for automatically returning the closure to its initial adjusted position when the pressure thereon is removed.

HORACE P. BROWN.